United States Patent
Kim et al.

(10) Patent No.: US 12,308,410 B2
(45) Date of Patent: May 20, 2025

(54) BATTERY RACK INCLUDING BRACKET CREATING SPACE BETWEEN WALLS AND RACK CASE AND POWER STORAGE APPARATUS COMPRISING SAME

(71) Applicant: LG ENERGY SOLUTION, LTD., Seoul (KR)

(72) Inventors: Dong-Hyun Kim, Daejeon (KR); Seung-Jun Lee, Daejeon (KR); Kown Son, Daejeon (KR); Kyung-Min Lee, Daejeon (KR); Goan-Su Jung, Daejeon (KR); Hee-Chan Kim, Daejeon (KR); Jong-Soo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 541 days.

(21) Appl. No.: 17/635,602

(22) PCT Filed: Aug. 5, 2020

(86) PCT No.: PCT/KR2020/010348
§ 371 (c)(1),
(2) Date: Feb. 15, 2022

(87) PCT Pub. No.: WO2021/040261
PCT Pub. Date: Mar. 4, 2021

(65) Prior Publication Data
US 2022/0294051 A1    Sep. 15, 2022

(30) Foreign Application Priority Data
Aug. 30, 2019   (KR) ........................ 10-2019-0107341

(51) Int. Cl.
*H01M 10/6563*   (2014.01)
*H01M 10/613*    (2014.01)
*H01M 50/211*    (2021.01)

(52) U.S. Cl.
CPC ..... *H01M 10/6563* (2015.04); *H01M 10/613* (2015.04); *H01M 50/211* (2021.01)

(58) Field of Classification Search
CPC . H01M 10/653; H01M 10/613; H01M 50/211
(Continued)

(56) References Cited

U.S. PATENT DOCUMENTS 4,109,064 A  *  8/1978  Warner ............... H01M 50/204
                                                180/68.5
7,128,219 B2    10/2006  Marraffa
(Continued)

FOREIGN PATENT DOCUMENTS

CN         1848518 A      10/2006
CN       101231541 A       7/2008
(Continued)

OTHER PUBLICATIONS

"bracket." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1228359. (Year: 2010).*
(Continued)

*Primary Examiner* — Sean P Cullen
(74) *Attorney, Agent, or Firm* — Birch, Stewart, Kolasch & Birch, LLP

(57) ABSTRACT

A battery rack includes a plurality of battery modules respectively having at least one battery cell, a rack case configured to accommodate the plurality of battery modules, and a separation bracket mounted at the rear of the rack case and configured to secure a predetermined separated space at the rear of the rack case.

9 Claims, 9 Drawing Sheets

(58) Field of Classification Search
USPC .................. 429/99, 100, 120, 156, 159
See application file for complete search history.

(56) References Cited

U.S. PATENT DOCUMENTS

| | | |
|---|---|---|
| 2006/0216582 A1 | 9/2006 | Lee et al. |
| 2008/0174947 A1 | 7/2008 | Chang |
| 2010/0035142 A1 | 2/2010 | Ha et al. |
| 2012/0263989 A1 | 10/2012 | Byun et al. |
| 2013/0313953 A1* | 11/2013 | Lee ................ H05K 5/0213 312/236 |
| 2014/0017531 A1 | 1/2014 | Uehara et al. |
| 2015/0190302 A1 | 7/2015 | Roubal |
| 2017/0324127 A1 | 11/2017 | Lee et al. |
| 2018/0062230 A1* | 3/2018 | Browell ............ H01M 10/6566 |
| 2018/0123200 A1* | 5/2018 | Golubkov ........... H01M 10/045 |
| 2018/0142674 A1 | 5/2018 | Hammerum et al. |
| 2018/0159009 A1 | 6/2018 | Schwarz et al. |

FOREIGN PATENT DOCUMENTS

| | | | |
|---|---|---|---|
| CN | 101517777 A | | 8/2009 |
| CN | 202228867 U | | 5/2012 |
| CN | 103460437 A | | 12/2013 |
| CN | 104157807 A | | 11/2014 |
| DE | 102016205920 A1 | * | 10/2017 |
| EP | 2 693 519 A1 | | 2/2014 |
| JP | 2017195070 A | * | 10/2017 |
| KR | 10-0617444 B1 | | 8/2006 |
| KR | 20-2009-0005698 U | | 6/2009 |
| KR | 10-2012-0117413 A | | 10/2012 |
| KR | 10-2016-0037542 A | | 4/2016 |
| KR | 10-1661563 B1 | | 10/2016 |
| KR | 10-2017-0025073 A | | 3/2017 |
| KR | 10-1773833 B1 | | 9/2017 |
| KR | 10-2017-0124884 A | | 11/2017 |
| KR | 10-2019-0031004 A | | 3/2019 |
| WO | WO 2008/035875 A1 | | 3/2008 |

OTHER PUBLICATIONS

International Search Report for PCT/KR2020/010348 mailed on Nov. 23, 2020.

Extended European Search Report for European Application No. 20857589.4, dated Oct. 27, 2022.

* cited by examiner

BATTERY RACK INCLUDING BRACKET CREATING SPACE BETWEEN WALLS AND RACK CASE AND POWER STORAGE APPARATUS COMPRISING SAME

TECHNICAL FIELD

The present disclosure relates to a battery rack and an energy storage system including the battery rack.

The present application claims priority to Korean Patent Application No. 10-2019-0107341 filed on Aug. 30, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery rack by using at least one battery module and adding other components. Here, according to various voltage and capacity requirements, an energy storage system may be configured to include at least one battery rack that includes at least one battery module.

A conventional battery rack is generally provided in a space of a rack container or the like, and includes a plurality of battery modules and a rack case for accommodating the plurality of battery modules. A cooling fan for cooling is provided at the front of the plurality of battery modules, and an air discharge portion for discharging air inside the modules is provided at the rear thereof.

When the conventional battery rack is installed in a space of a rack container or the like, it is essential to secure an air flow path for cooling the battery modules. Since the cooling fan is installed at the front of the battery modules and exposed at the front of the rack case, a worker or the like visually recognizes the cooling fan easily during installation, and the battery rack is installed while securing a predetermined space at the front of the rack case.

However, the air discharge portion of the battery modules is installed at the rear of the battery rack, but it is not easy for a worker or the like to recognize the air discharge portion during installation, so it is relatively difficult to secure a space at the rear when installing the battery rack. Rather, when installing the battery rack, in order to secure the space in the entire rack container, the rear side of the battery rack is frequently installed in close contact with a structure such as a wall.

When a battery rack is installed, if a predetermined space is not secured at the rear side of the battery rack, air is not discharged smoothly through the air discharge portion at the rear of the battery module, which significantly deteriorates the cooling performance of the battery rack.

Therefore, it is required to find a way to secure the air flow path when installing the battery rack so that the cooling performance of the battery rack does not deteriorate later.

DISCLOSURE

Technical Problem

Therefore, the present disclosure is directed to providing a battery rack, which may secure an air flow path for cooling when the battery rack is installed, and an energy storage system including the battery rack.

In addition, the present disclosure is also directed to providing a battery rack, which may prevent the cooling performance from deteriorating, and an energy storage system including the battery rack.

Technical Solution

In one aspect of the present disclosure, there is provided a battery rack, comprising: a plurality of battery modules, each battery module of the plurality of battery modules having at least one battery cell; a rack case configured to accommodate the plurality of battery modules; and a separation bracket mounted at a rear of the rack case and configured to create a predetermined separated space at the rear of the rack case.

The separation bracket may be pivotally mounted at the rear of the rack case.

The separation bracket may be installed at a lower end of a rear surface of the rack case.

The separation bracket may be pivotal between a first location at which the separation bracket is disposed parallel to a rear surface of the rack case and a second location at which the separation bracket is disposed to protrude by a predetermined length from the rear surface of the rack case.

The separation bracket may be disposed at the first location when the battery rack is carried and may be disposed at the second location when the battery rack is installed.

When the separation bracket is disposed at the second location, the predetermined separated space may be formed at the rear of the rack case.

The separation bracket may be elastically pivoted from the first location toward the second location.

Each of the plurality of battery modules may further include a module case configured to accommodate the at least one battery cell; a cooling fan installed at a front surface of the module case to guide air into the module case; and an air discharge portion provided at a rear surface of the module case to discharge the air inhaled through the cooling fan to the outside.

The air discharge portion may discharge the air in the module case toward the predetermined separated space.

In addition, the present disclosure also provides an energy storage system, comprising at least one battery rack according to the above embodiments.

Advantageous Effects

According to various embodiments as above, it is possible to provide a battery rack, which may secure an air flow path for cooling when the battery rack is installed, and an energy storage system including the battery rack.

In addition, according to various embodiments as above, it is possible to provide a battery rack, which may prevent the cooling performance from deteriorating, and an energy storage system including the battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
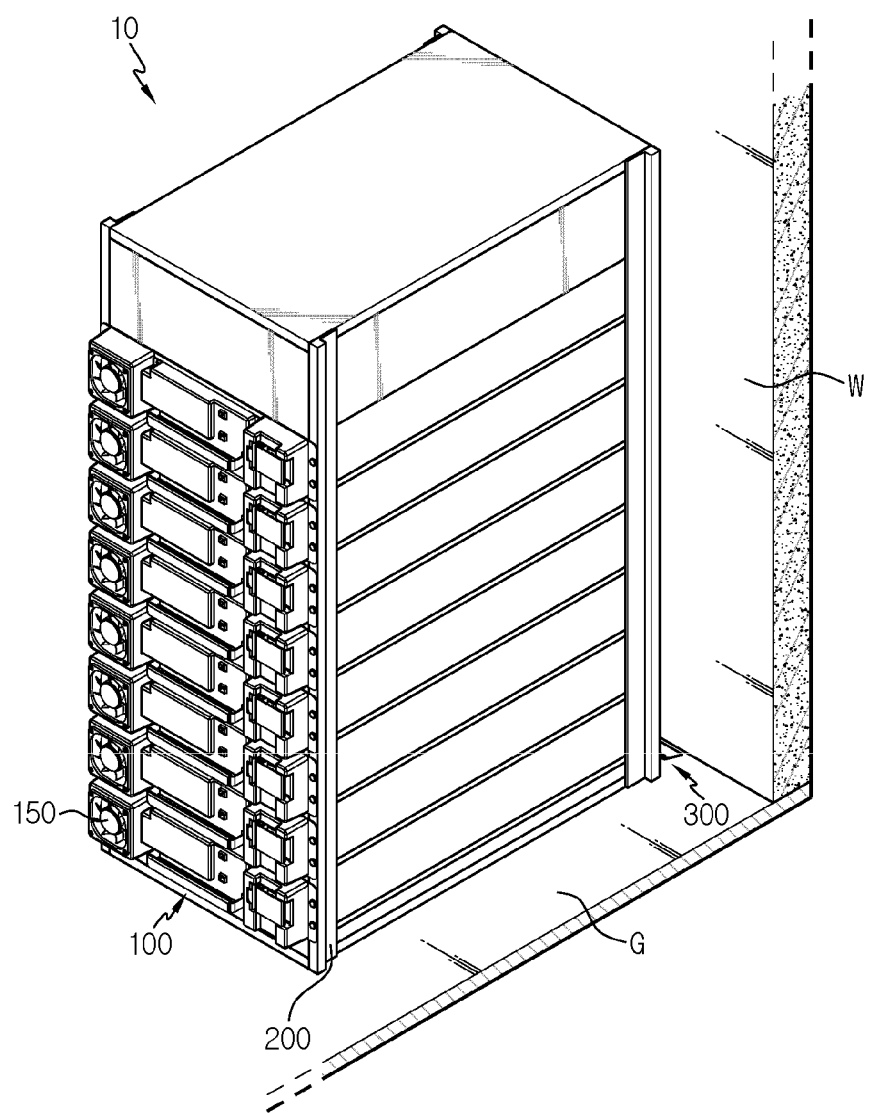
FIG. 1 is a diagram for illustrating a battery rack according to an embodiment of the present disclosure.
Figure 2:
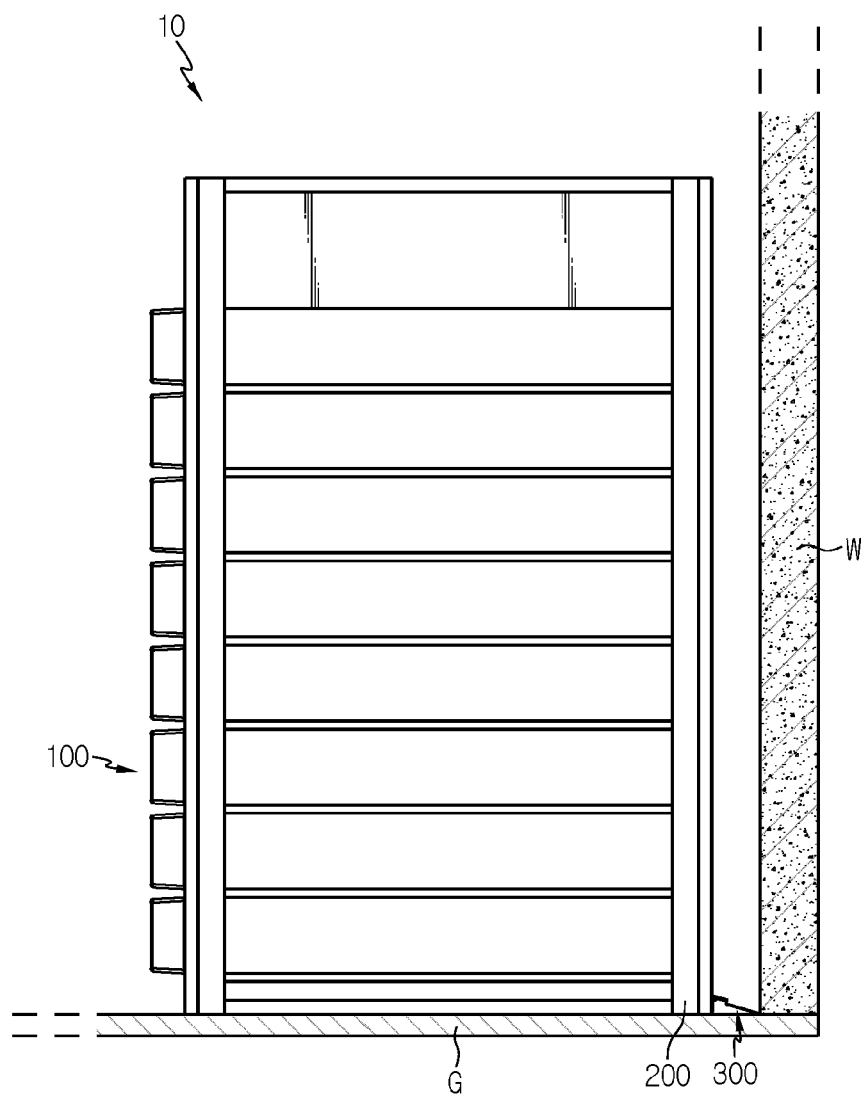
FIG. 2 is a side view showing the battery rack of FIG. 1.
Figure 3:
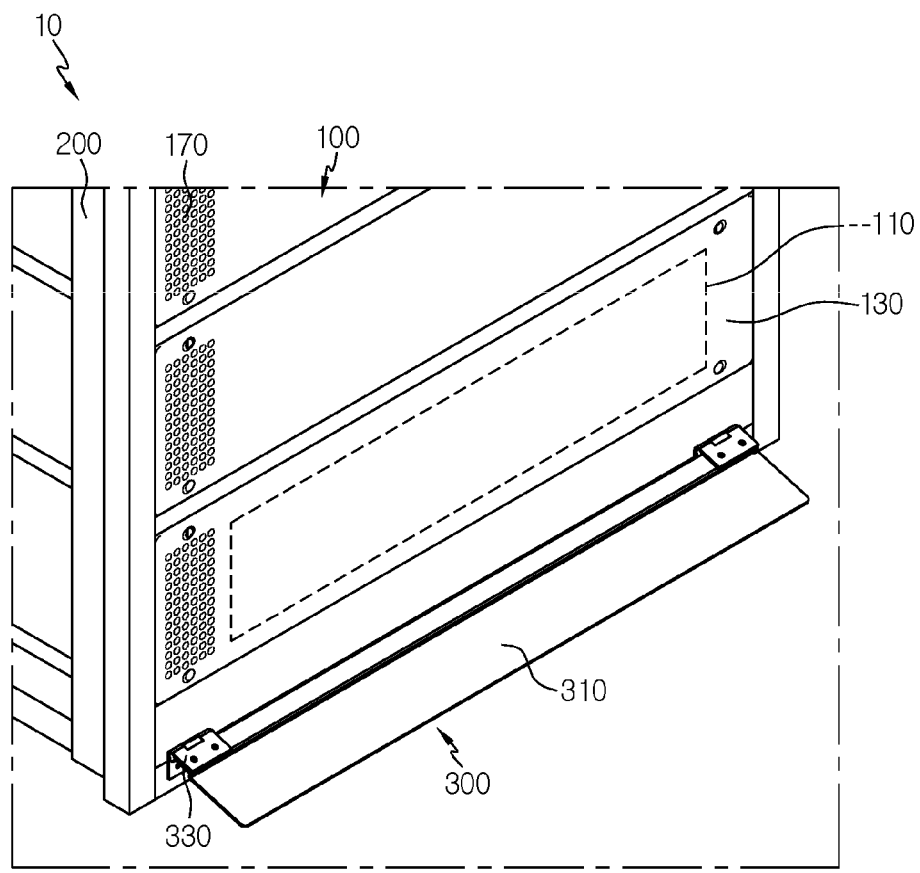
FIG. 3 is a diagram for illustrating a main part of the battery rack of FIG. 2.

FIG. 1 is a diagram for illustrating a battery rack according to an embodiment of the present disclosure, FIG. 2 is a side view showing the battery rack of FIG. 1, and FIG. 3 is a diagram for illustrating a main part of the battery rack of FIG. 2.

Referring to FIGS. 1 to 3, a battery rack 10 may include a battery module 100, a rack case 200, and a separation bracket 300.

The battery module 100 may be provided in plural. The plurality of battery modules 100 may be accommodated in the rack case 200, explained later. Specifically, the plurality of battery modules 100 may be stacked in the rack case 200 along a vertical direction of the rack case 200, explained later.

Each of the plurality of battery modules 100 may include a battery cell 110, a module case 130, a cooling fan 150, and an air discharge portion 170.

One battery cell 110 or a plurality of battery cells 110 may be provided. Hereinafter, in this embodiment, it will be described that a plurality of battery cells 110 are provided.

The plurality of battery cells 110 are secondary batteries and may be provided as at least one of a pouch-type secondary battery, a rectangular secondary battery and a cylindrical secondary battery. Hereinafter, in this embodiment, it will be described that the plurality of battery cells 110 are pouch-type secondary batteries.

The module case 130 may accommodate the plurality of battery cells 110 therein. Accordingly, the module case 130 may have an accommodation space for accommodating the plurality of battery cells 110.

The cooling fan 150 may be installed at a front surface of the module case 130, at the front of the module case 130. The cooling fan 150 may guide an air into the module case 130 in order to cool the plurality of battery cells 110.

The air discharge portion 170 may be provided at a rear surface of the module case 130, at the rear of the module case 130. The air discharge portion 170 may discharge the air inhaled into the module case 130 through the cooling fan 150 to the outside of the module case 130. Specifically, the air discharge portion 170 may discharge the air inside the module case 130 toward a predetermined separated space d, explained later.

The rack case 200 may accommodate the plurality of battery modules 100. Specifically, the rack case 200 may accommodate the plurality of battery modules 100 so as to be stacked along a vertical direction of the rack case 200. If the plurality of battery modules 100 are mounted to the rack case 200, the cooling fan 150 of the battery modules 100 is disposed at the front of the rack case 200, and the air discharge portion 170 of the battery modules 100 may be disposed at the rear of the rack case 200.

The separation bracket 300 is mounted at the rear of the rack case 200, and when the battery rack 10 is installed, the separation bracket 300 may guide to secure the predetermined separated space d at the rear of the rack case 200. Here, the separated space d preferably has a length of at least 60 mm to secure the air flow path, and the separation bracket 300 may be formed to secure at least the length of the separated space d described above.

The separation bracket 300 may be pivotally mounted at the rear of the rack case 200. Specifically, the separation bracket 300 is installed at a bottom end of the rear surface of the rack case 200 and may be mounted to be pivotal at the bottom end of the rear surface of the rack case 200.

Seeing a pivoting range of the separation bracket 300, the separation bracket 300 may be pivoted between a first location at which the separation bracket 300 is disposed parallel to the rear surface of the rack case 200 along a vertical direction of the rack case 200, namely an upper and lower direction of the rack case 200, and a second location at which the separation bracket 300 is disposed to protrude by a predetermined length from the rear of the rack case 200 along a horizontal direction of the rack case 200.

Here, the separation bracket 300 may be elastically pivoted from the first location toward the second location. Meanwhile, at the second location, the separation bracket 300 is disposed to be inclined downward at a predetermined angle, so that its end may come into contact with a structure such as the ground G or a wall W.

When the battery rack 10 is carried, the separation bracket 300 may be disposed at the first location, and when the battery rack 10 is installed, the separation bracket 300 may be disposed at the second location. When the separation bracket 300 is disposed at the second location, the predetermined separated space d may be formed at the rear of the rack case 200.

Hereinafter, the separation bracket 300 will be described more specifically.

The separation bracket 300 may include a bracket plate 310 and a bracket hinge 330.

The bracket plate 310 has a substantially rectangular shape and may be formed to have a predetermined length along a width direction of the rack case 200. The bracket plate 310 may be connected to the rack case 200 to be pivotable between the first location and the second location.

The bracket plate 310 may be made of a metal material. Meanwhile, a magnetic member may be provided at the rear of the rack case 200 to make a magnetic contact with the bracket plate 310 for more stable fixation of the separation bracket 300 when the separation bracket 300 is disposed at the first location.

The bracket hinge 330 is coupled to the bracket plate 310 and the rack case 200, and may be mounted at a bottom end of the rear surface of the rack case 200. By means of the bracket hinge 330, a worker or the like may manipulate the bracket plate 310 to be pivoted. Meanwhile, the bracket hinge 330 may have an elastic member that provides an elastic force so that the bracket plate 310 may be elastically pivoted.

Figure 4:
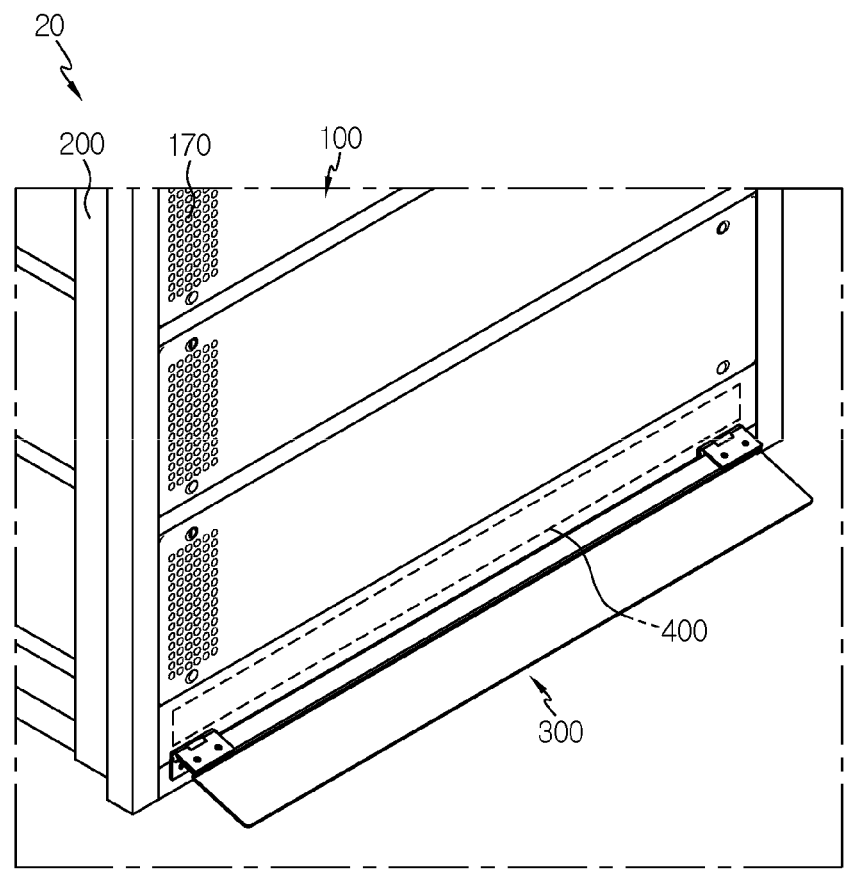
FIG. 4 is a diagram for illustrating a battery rack according to another embodiment of the present disclosure.

FIG. 4 is a diagram for illustrating a battery rack according to another embodiment of the present disclosure.

A battery rack 20 according to this embodiment is similar to the battery rack 10 of the former embodiment, so features identical or similar to those of the former embodiment will not be described in detail and features different from the former embodiment will be described in detail.

Referring to FIG. 4, the battery rack 20 may include a battery module 100, a rack case 200, a separation bracket 300, and a bracket control unit 400.

The battery module 100, the rack case 200 and the separation bracket 300 are substantially identical or similar to the former embodiment, and thus will not be described in detail again.

The bracket control unit 400 is provided in the rack case 200 and may be electrically connected to the separation bracket 300. The bracket control unit 400 may control the pivotal motion of the separation bracket 300. As an example, when the rack case 200 of the battery rack 20 is separated from the ground G (see FIG. 1), the bracket control unit 400 may pivot the separation bracket 300 to be disposed at the first location, and when the rack case 200 of the battery rack 20 makes a contact with the ground G, the bracket control unit 400 may pivot the separation bracket 300 to be disposed at the second location.

To this end, the bracket control unit 400 includes a drive motor for driving the separation bracket 300, a detection sensor for detecting the contact of the rack case 200 with the ground G, a control board for controlling the drive motor and the detection sensor, and the like.

As such, the battery rack 20 according to this embodiment may pivot the separation bracket 300 through the bracket control unit 400 by an electrical automatic operation instead of a separate user manual operation.

Figure 5:
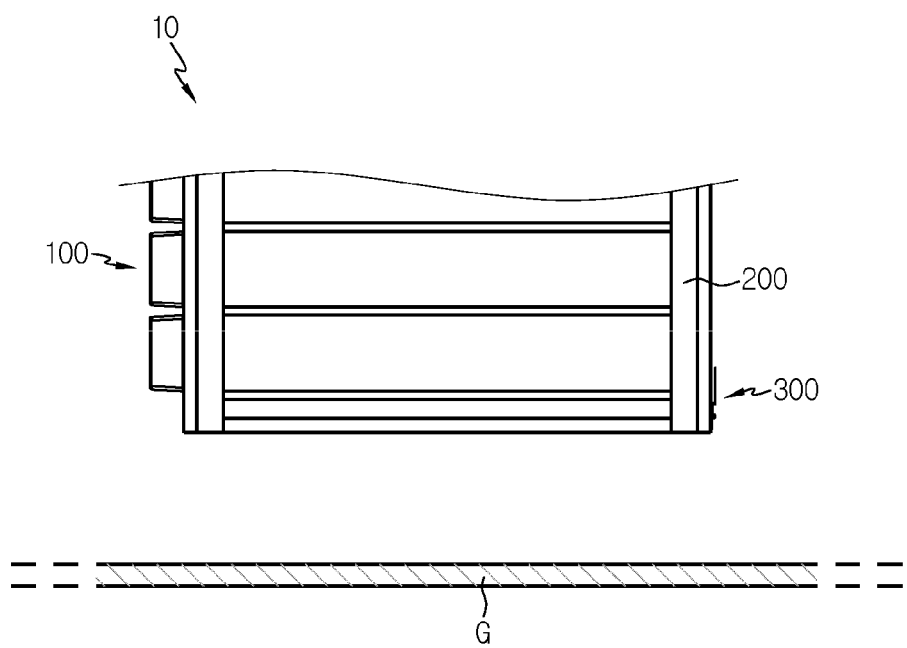
FIGS. 5 and 6 are diagrams for illustrating the battery rack of FIG. 1 when being carried.
Figure 6:
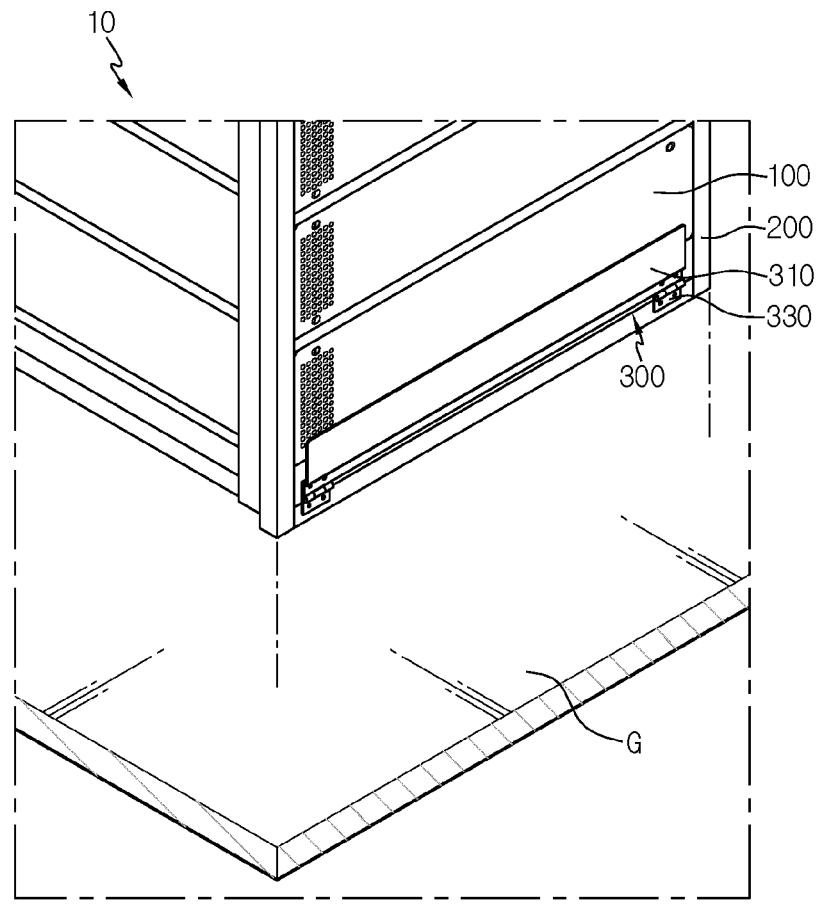
Figure 7:
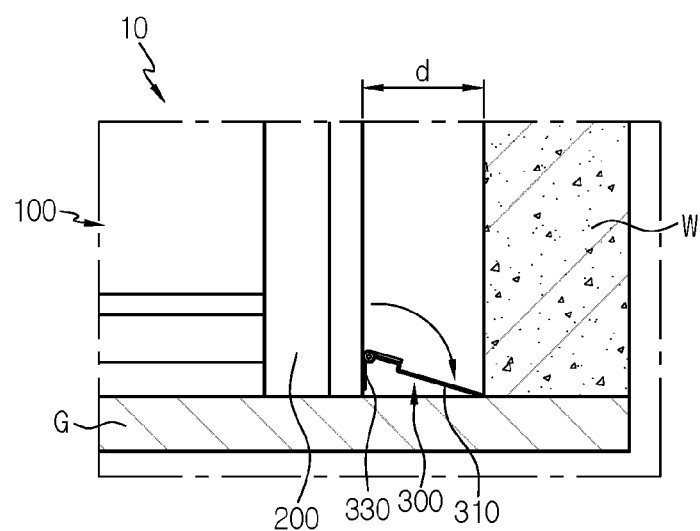
FIG. 7 is a diagram for illustrating the battery rack of FIG. 1 when being installed.

FIGS. 5 and 6 are diagrams for illustrating the battery rack of FIG. 1 when being carried, and FIG. 7 is a diagram for illustrating the battery rack of FIG. 1 when being installed.

Referring to FIGS. 5 and 6, when the battery rack 10 is carried for installation, the worker or the like may lift the battery rack 10 and move to an installation location. When the battery rack 10 is carried, the rack case 200 may be spaced from the ground G by a predetermined distance.

Meanwhile, when the battery rack 10 is carried, the separation bracket 300 may be disposed at the rear of the rack case 200 in a state of being placed at the first location. In this embodiment, since the battery rack 10 is carried in a state where the separation bracket 300 is attached to the rack case 200 together, when fixing the rack case 200 is fixed for installation, work convenience may be significantly improved than a conventional case where a separate anchor member or the like is used for fixation.

Moreover, in this embodiment, at the first location, the separation bracket 300 is disposed in close contact with the rear surface of the rack case 200 in a direction parallel to the vertical direction of the rack case 200, so the size increase of the battery rack 10 caused by the separation bracket 300 may be minimized. Thus, it is possible to reduce a packaging volume of the battery rack 10, minimize the increase in costs such as transportation charges, and improve the work efficiency for a packaging work for carrying the battery rack 10.

Referring to FIG. 7, when the battery rack 10 is installed after being completely carried, the worker or the like may pivot the separation bracket 300 to the second location so that the battery rack 10 is separated by a predetermined distance from a structure such as a wall W in the space where the battery rack 10 is installed.

Meanwhile, the operation for disposing the separation bracket 300 toward the second location may also be automatically performed by the bracket control unit 400 when the rack case 200 makes a contact with the ground G, similar to the battery rack 20 (see FIG. 4) of the former embodiment.

If the separation bracket 300 is disposed at the second location as above, the predetermined separated space d may be formed at the rear of the battery rack 10. In this embodiment, by disposing the separation bracket 300 at the second location, the separated space d may be more easily secured. Thus, when the battery rack 10 is installed, an air flow path for cooling the battery rack 10 may be secured more easily and conveniently.

If a battery pack is installed using a separate anchor member or the like as in the conventional art, the anchor member may be lost due to the mistake of a worker or the like, and the installation work may be performed in a state where the anchor member is not yet installed. In this case, the rear surface of the battery rack 10 may be more highly likely to be brought into close contact with a structure such as the wall W. In general, this is because the worker or the like thinks that it is more structurally stable to closely adhere the rear surface of the battery rack 10 to a structure such as the wall W. In addition, a battery pack is installed using a separate anchor member or the like as in the conventional art, in frequent cases, the battery pack may not be used depending on the installation environment due to the characteristics of the anchor member.

In this embodiment, by means of the separation bracket 300, the separation bracket 300 may be more conveniently disposed at the second location by pivoting according to a manual operation of the worker or the like when the battery rack 10, 20 is installed or by pivoting automatically performed when the rack case 200 is disposed at the ground G. Thus, when the battery rack 10, 20 is installed, the predetermined separated space d may be secured easily and conveniently, in a more compulsory way, at the rear of the battery rack 10, 20.

Figure 8:
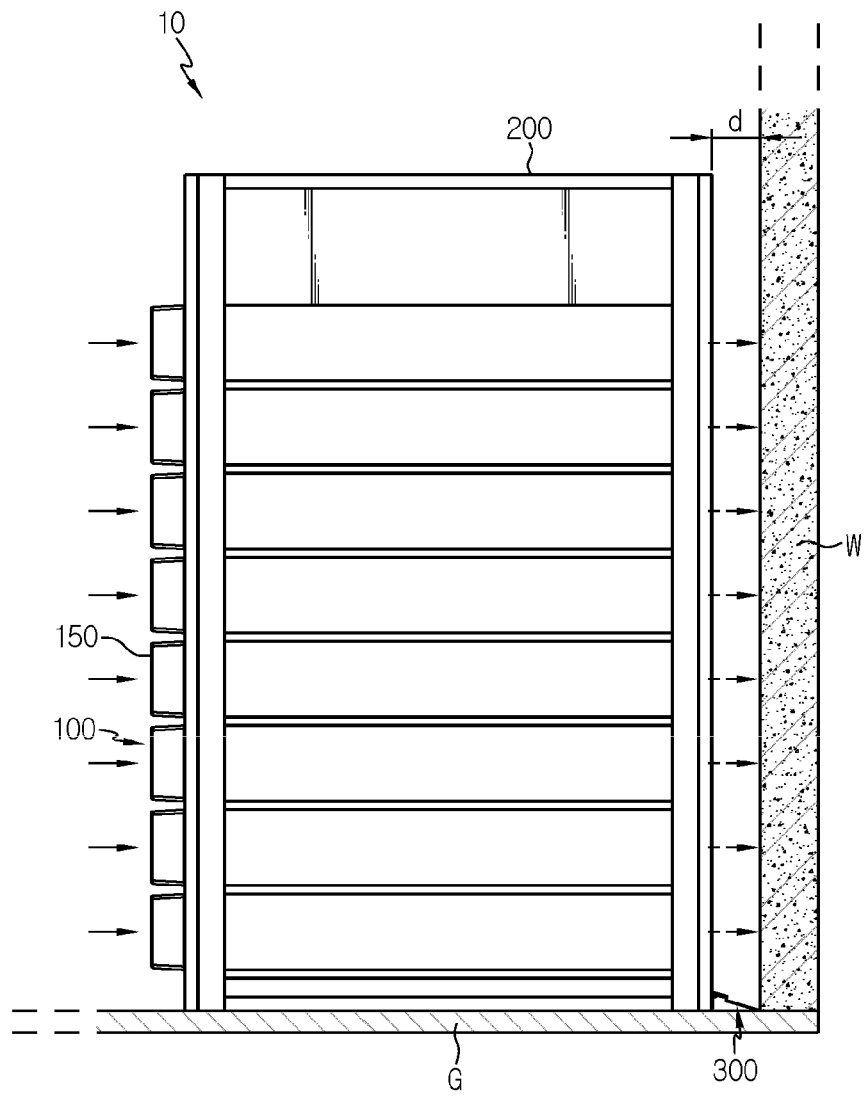
FIGS. 8 and 9 are diagrams for illustrating the battery rack of FIG. 1 when being cooled.
Figure 9:
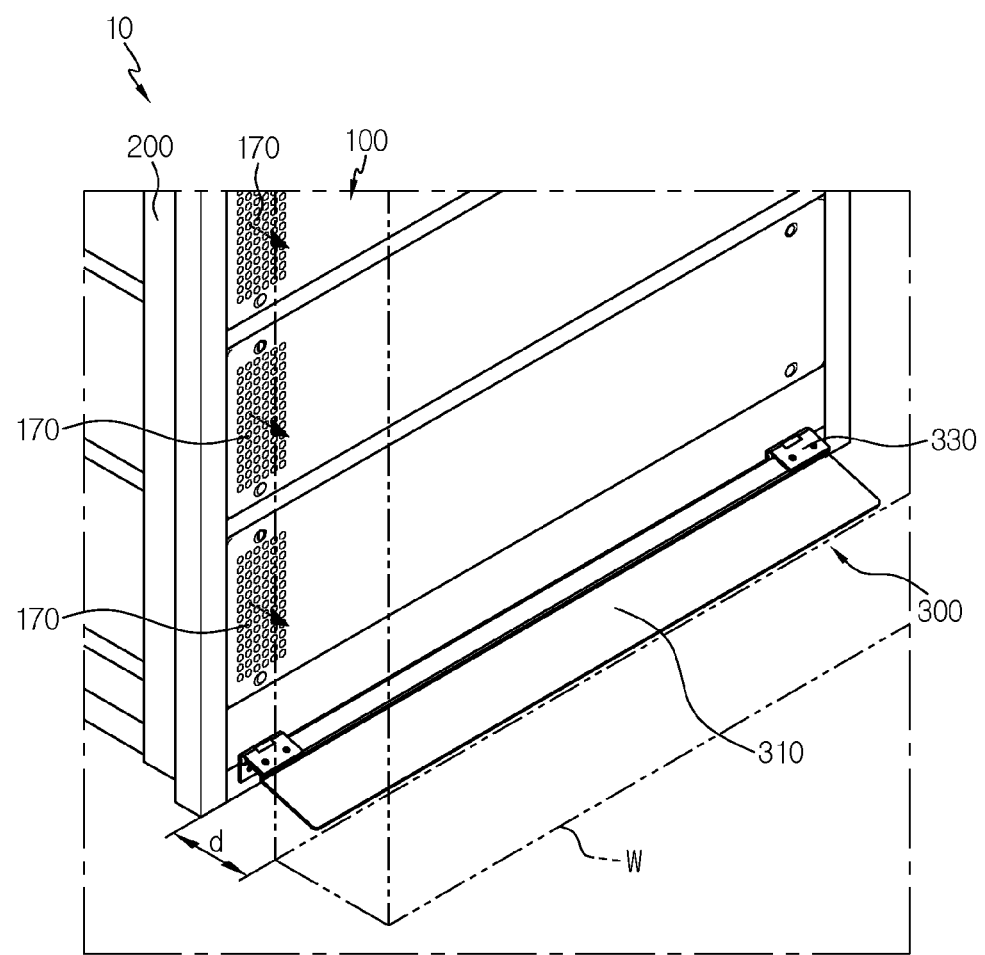

FIGS. 8 and 9 are diagrams for illustrating the battery rack of FIG. 1 when being cooled.

Referring to FIGS. 8 and 9, for cooling the battery modules 100 of the battery rack 10, an air may be introduced into the battery modules 100 through the cooling fan 150 provided at the front of the battery modules 100.

The air introduced into the battery modules 100 may cool the interior of the battery modules 100, and after that, the air may be discharged out of the battery modules 100 through the air discharge portion 170 provided at the rear of the battery modules 100.

In this embodiment, if the battery rack 10 is installed, the separated space d is formed at the rear of the battery rack 10 by means of the separation bracket 300, thereby securing the air flow path. Although not shown, the battery rack 20 (see FIG. 4) of the former embodiment also secures the air flow path.

Accordingly, in this embodiment, through the air flow path formed through the separated space d between the rear of the battery rack 10 and the structure such as the wall W, air may be discharged more smoothly and effectively at the air discharge portion 170 of the plurality of battery modules 100 to the outside of the battery modules 100.

Therefore, since the battery rack 10, 20 according to this embodiment has the air flow path for securing the cooling performance when the battery rack 10, 20 is installed, it is possible to prevent the cooling performance of the battery rack 10, 20 from deteriorating and to improve the cooling performance efficiency of the battery rack 10, 20.

Figure 10:
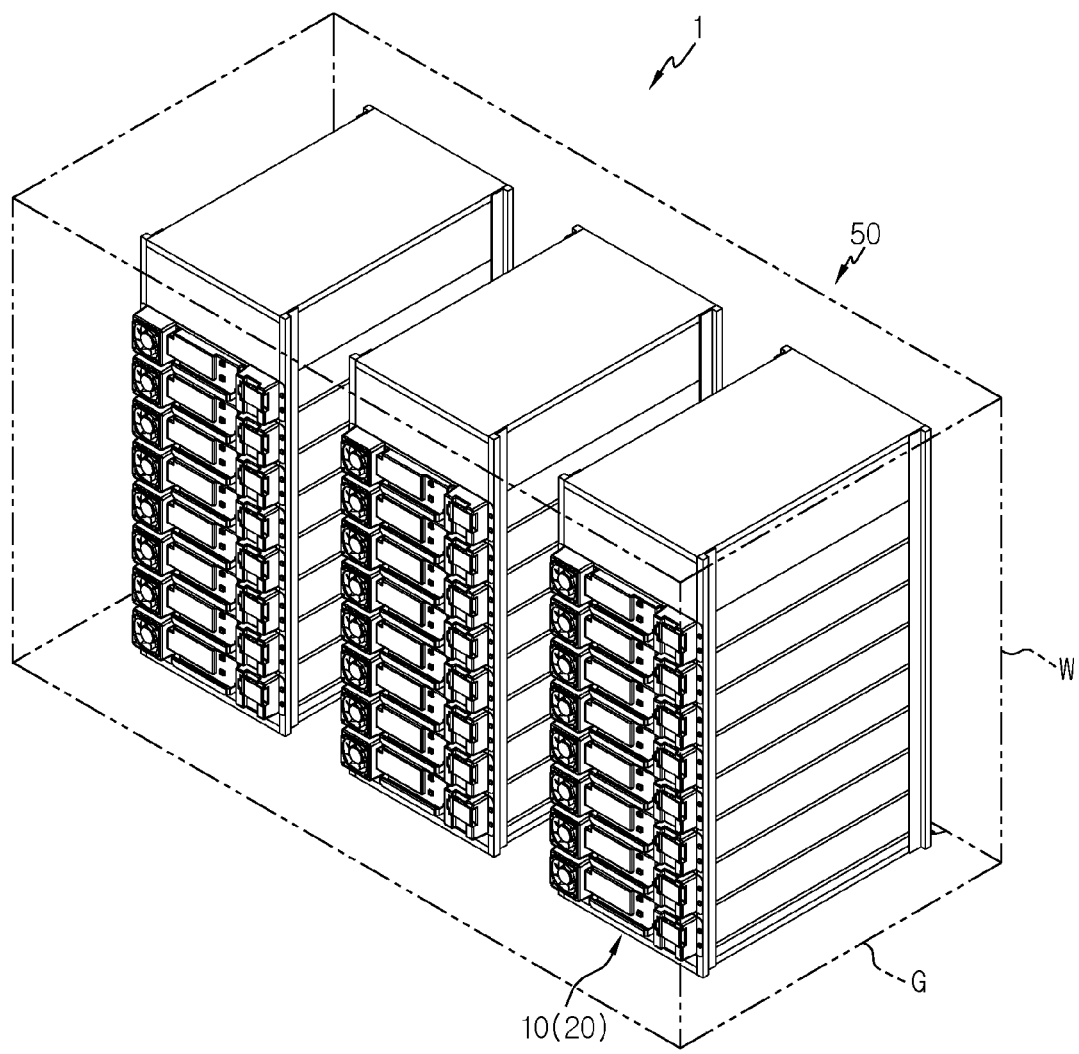
FIG. 10 is a diagram for illustrating an energy storage system according to an embodiment of the present disclosure.

FIG. 10 is a diagram for illustrating an energy storage system according to an embodiment of the present disclosure.

Referring to FIG. 10, an energy storage system 1 is an energy source and may be used for home or industrial use. The energy storage system 1 may include at least one battery rack 10 of the former embodiment, or a plurality of battery racks 10, 20 in this embodiment, and a rack container 50 for accommodating the plurality of battery racks 10, 20.

Since the energy storage system 1 according to this embodiment includes the battery rack 10, 20 of the former embodiment, it is possible to provide an energy storage system 1 that includes all the advantages of the battery rack 10, 20 of the former embodiment.

According to various embodiments as above, it is possible to provide a battery rack 10, 20, which may secure an air flow path for cooling when the battery rack 10, 20 is installed, and an energy storage system 1 including the battery rack 10, 20.

In addition, according to various embodiments as above, it is possible to provide a battery rack 10, 20, which may prevent the cooling performance from deteriorating, and an energy storage system 1 including the battery rack 10, 20.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery rack, comprising:
   a plurality of battery modules, each battery module of the plurality of battery modules having at least one battery cell;
   a rack case configured to accommodate the plurality of battery modules, the plurality of battery modules stacked in a vertical direction in the rack case; and
   a separation bracket mounted to an exterior surface of a rear of the rack case and configured to create a predetermined separated space at the rear of the rack case,
   wherein the separation bracket is pivotally mounted at the rear of the rack case, and
   wherein the separation bracket pivots between a first location and a second location.

2. The battery rack according to claim 1, wherein the separation bracket is installed at a lower end of a rear surface of the rack case.

3. The battery rack according to claim 1, wherein each of the plurality of battery modules further includes:
   a module case configured to accommodate the at least one battery cell;
   a cooling fan installed at a front surface of the module case to guide air into the module case; and
   an air discharge portion provided at a rear surface of the module case to discharge the air inhaled through the cooling fan to the outside.

4. The battery rack according to claim 3, wherein the air discharge portion discharges the air in the module case toward the predetermined separated space.

5. The battery rack according to claim 1, wherein the separation bracket is parallel to a rear surface of the rack case in the first location, and
   wherein the separation bracket protrudes by a predetermined length from the rear surface of the rack case in the second location.

6. The battery rack according to claim 5, wherein the separation bracket is disposed at the first location when the battery rack is carried and is disposed at the second location when the battery rack is installed.

7. The battery rack according to claim 5, wherein when the separation bracket is disposed at the second location, the predetermined separated space is formed at the rear of the rack case.

8. The battery rack according to claim 5, wherein the separation bracket is elastically pivoted from the first location toward the second location.

9. An energy storage system, comprising at least one battery rack as defined in claim 1.

* * * * *